US012054056B2

(12) United States Patent
Blase et al.

(10) Patent No.: US 12,054,056 B2
(45) Date of Patent: Aug. 6, 2024

(54) NON TRACK-BOUND, ELECTRICALLY DRIVEN VEHICLE

(71) Applicant: Siemens Mobility GmbH, Munich (DE)

(72) Inventors: Bastian Blase, Berlin (DE); Andrej Dronnik, Berlin (DE); Leon Eversberg, Berlin (DE); Steffen Jakobi, Berlin (DE); Goeran Saenger, Berlin (DE)

(73) Assignee: Siemens Mobility GmbH, Munich (DE)

( * ) Notice: Subject to any disclaimer, the term of this patent is extended or adjusted under 35 U.S.C. 154(b) by 811 days.

(21) Appl. No.: 17/277,849

(22) PCT Filed: Sep. 16, 2019

(86) PCT No.: PCT/EP2019/074702
§ 371 (c)(1),
(2) Date: Mar. 19, 2021

(87) PCT Pub. No.: WO2020/058190
PCT Pub. Date: Mar. 26, 2020

(65) Prior Publication Data
US 2021/0347264 A1    Nov. 11, 2021

(30) Foreign Application Priority Data

Sep. 19, 2018   (DE) ........................ 102018215941.6

(51) Int. Cl.
*B60L 5/10*        (2006.01)
*B60L 5/00*        (2006.01)
(Continued)

(52) U.S. Cl.
CPC ................... *B60L 5/10* (2013.01); *B60L 5/00* (2013.01); *B60L 5/04* (2013.01); *B60L 5/12* (2013.01);
(Continued)

(58) Field of Classification Search
CPC ...... B60L 5/00; B60L 5/04; B60L 5/10; B60L 5/12; B60L 5/14; B60L 5/19; B60L 5/22;
(Continued)

(56) References Cited

U.S. PATENT DOCUMENTS 9,238,411 B2 *   1/2016   Dronnik .................... B60L 5/08
2014/0041951 A1  2/2014   Tojima et al.
(Continued)

FOREIGN PATENT DOCUMENTS

CN   201065072 Y   5/2008
CN   102343821 A   2/2012
(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

An electrically driven vehicle contains a current collector for supplying electrical energy from a bipolar overhead line system. The collector has an articulated support rod, which bears, on the contact wire side, a contact collector having a contact strip, and which is coupled, on the vehicle side, to a lift drive for positioning the support rod and for pressing the contact collector to a contact wire of the overhead wire system, a detection device for detecting a lateral position of a contact point of the contact wire on the contact strip and a driver assistance system for executing an automatic steering intervention as a function of the detected lateral position of the contact point. The vehicle has increased availability for a feed of electrical energy from the overhead line system in that the contact strip is supported on the contact collector via at least two spring elements.

9 Claims, 1 Drawing Sheet

(51) Int. Cl.
*B60L 5/04* (2006.01)
*B60L 5/12* (2006.01)
*B60L 5/14* (2006.01)
*B60L 5/19* (2006.01)
*B60L 5/22* (2006.01)
*B60L 5/24* (2006.01)
*B60L 5/28* (2006.01)
*B60L 5/30* (2006.01)
*B62D 15/02* (2006.01)
*B60L 9/00* (2019.01)

(52) U.S. Cl.
CPC .............. *B60L 5/14* (2013.01); *B60L 5/19* (2013.01); *B60L 5/22* (2013.01); *B60L 5/24* (2013.01); *B60L 5/28* (2013.01); *B60L 5/30* (2013.01); *B62D 15/025* (2013.01); *B60L 9/00* (2013.01); *B60L 2240/10* (2013.01); *B60L 2240/24* (2013.01); *B60L 2250/00* (2013.01); *B60L 2260/40* (2013.01)

(58) Field of Classification Search
CPC ...... B60L 5/24; B60L 5/28; B60L 5/30; B60L 2240/24; B60L 2240/40; B60L 2240/10; B60L 2250/00; B60L 2260/00; B60L 9/00; B62D 15/025

USPC ........................................................ 191/59.1
See application file for complete search history.

(56) References Cited

U.S. PATENT DOCUMENTS

2017/0371350 A1* 12/2017 Engdahl ............... G05D 1/0276
2020/0238833 A1    7/2020 Stark et al.

FOREIGN PATENT DOCUMENTS

| CN | 107804173 A | 3/2018 | |
|---|---|---|---|
| DE | 29606346 U1 | 6/1996 | |
| DE | 19601009 C1 * | 6/1997 | ............... B60L 5/19 |
| DE | 102011076615 A1 | 11/2012 | |
| DE | 102012205276 A1 | 10/2013 | |
| DE | 102012213460 A1 * | 2/2014 | .......... B60L 11/1842 |
| DE | 102016009894 A1 * | 2/2018 | |
| DE | 102016222663 A1 * | 5/2018 | ............. B60G 11/62 |
| DE | 102017215340 A1 | 3/2019 | |
| EP | 0363623 A1 | 4/1990 | |
| EP | 1710116 A2 | 10/2006 | |
| EP | 2165917 A2 | 3/2010 | |
| EP | 3264213 A1 * | 1/2018 | ............... B60L 5/10 |
| GB | 1480311 A | 7/1977 | |
| KR | 20010013736 A * | 2/2001 | |
| WO | WO-2012163762 A2 * | 12/2012 | .......... B60L 11/1837 |

* cited by examiner

NON TRACK-BOUND, ELECTRICALLY DRIVEN VEHICLE

BACKGROUND OF THE INVENTION

Field of the Invention

The invention relates to a non-track-bound, electrically driven vehicle in accordance with the preamble of the independent claim.

One such vehicle, which is embodied as a truck or bus, is known from the published unexamined application DE 10 2012 205 276 A1. It comprises a current collector for feeding electrical energy from a two-pole overhead line system arranged along a lane with contact wires embodied as forward and return conductors. The current collector has at least one contact strip per contact wire, with an operating region for contacting the contact wires. The vehicle additionally comprises recording means for directly and indirectly recording the position of the current collector relative to the contact wires. Furthermore, the vehicle comprises a steering assistance system for automatically steering the vehicle as a function of the recorded relative position.

The recording means of said known vehicle have a position determination system for determining a current vehicle position of the vehicle on the lane and a database with stored contact wire positions of the contact wires along the lane. The recording means are embodied to calculate the relative position from the currently determined vehicle position and from the assigned contact wire positions. In the case of this indirect recording of the relative position, inaccuracies in the stored contact wire positions exist primarily due to the influence of crosswind. In addition, there is an elaborate interface with the position determination system of the vehicle. If the position determination system is based on an optical measurement, such as by way of a video camera, then there are also weather-dependent measuring problems in the event of precipitation.

The recording means of this vehicle also have contact position sensors for determining the current contact positions of the contact wires on the contact strips. In this context, the recording means are embodied to ascertain the current position of the vehicle relative to the contact wires from the determined contact positions. In the case of this direct recording of the relative position, optical sensors are used for example, such as laser scanners for example, which sense the position of the contact wires by means of laser radiation. The position of the contact wires relative to the vehicle can be inferred from the arrangement of the sensors on the vehicle in each case. Laser scanners, however, are comparatively expensive and require powerful computers and elaborate software in order to evaluate the measurement results. In this context, weather-dependent interference also occurs during mist, snow and heavy rain.

If the information regarding the current lateral position of the contact point between contact wire and contact strip is missing, then the current collector has to be lowered for safety reasons and it is therefore not available for feeding energy.

SUMMARY OF THE INVENTION

The invention is therefore based on the object of providing a generic vehicle with increased availability for feeding electrical energy from an overhead line system.

The object is achieved according to the invention by a vehicle with the features specified in the independent claim.

Accordingly, a non-track-bound, electrically driven vehicle comprises a current collector for feeding electrical energy from a two-pole overhead line system. The current collector has an articulated support linkage, which supports a contact rocker with a contact strip on the contact wire side and which on the vehicle side is coupled to a lift drive for setting up the support linkage and for pressing the contact rocker onto a contact wire of the overhead line system. The vehicle further comprises a recording facility for recording the lateral position of a contact point of the contact wire on the contact strip. In addition, the vehicle comprises a driver assistance system for executing an automatic steering intervention as a function of the recorded lateral position of the contact point.

The current collector may have two contact rockers that are arranged adjacently to one another in the vehicle longitudinal direction and each contact one of two contact wires of the two-pole overhead line system. Each contact rocker may have two elongated contact strips that are arranged one behind the other in the vehicle longitudinal direction and run in parallel with one another. What is described in the following for a contact strip and a contact wire may also apply to multiple or all of a plurality of contact strips.

According to the invention, the contact strip is braced against the contact rocker via at least two spring elements, wherein the recording facility has two path sensors for measuring compression paths of the spring elements and an evaluation unit connected to the path sensors for ascertaining the lateral position of the contact point from sensor signals representing the measured compression paths. The spring elements, for example embodied as leaf springs, have a known spring constant, meaning that it is possible to infer the forces acting on the spring elements from the compression paths. Depending on the spacing ratio in which the contact wire contacts the contact strip between the two spring elements, an unambiguous force ratio is produced at the spring elements, which in turn corresponds to an unambiguous ratio of the compression paths or the sensor signals which represent them, respectively. The compression path of a spring element is proportional to the quotient derived from the spacing between contact point and the other spring element and the spacing between the two spring elements. One such unambiguous signal that represents the lateral position of the contact point may be forwarded from the evaluation unit to the driver assistance system via the data bus of the vehicle. By continuously recording the lateral position, it is possible for an impending slipping of the contact wire from the contact strip to be identified at an early stage, which makes it possible for an early and therefore gentle countersteering to take place by way of the driver assistance system. Jumps or jerking movements caused by sudden countersteering are therefore avoided. The availability of feeding energy from the overhead line is increased by automatically maintaining contact via the driver assistance system.

In an advantageous embodiment of the vehicle according to the invention, the path sensors are embodied for measuring the compression paths of the spring elements in a contactless manner. By using a contactless path sensor, for example a sensor measuring in a capacitive or inductive manner, in particular what is known as an OCD sensor, an influencing of the measurement values by the measuring system is avoided and an electrical insulation between contact strip and the rest of the current collector becomes possible.

In a further advantageous embodiment of the vehicle according to the invention, the evaluation unit is embodied to ascertain the lateral position of the contact point from the difference between the quotient derived from the two sensor signals representing the compression paths and the reciprocal value of said quotient. Since contactless sensors in particular have a non-linear relation between the measured compression path and the output sensor signal, a method is proposed here for processing the sensor signals, which delivers a result that is representative of the lateral position of the contact point and has a lower non-linearity, in particular compared with conventional difference methods.

In a further advantageous embodiment of the vehicle according to the invention, the driver assistance system is configured to execute the automatic steering intervention in such a manner that the contact point of the contact wire on the contact strip is kept within a predefined operating region of the contact strip. The driver assistance system is then able to perform a countersteering steering intervention if the contact point of the contact wire reaches around a preset spacing from the center of the contact strip, wherein the spacing is less than half the operating region of the contact strip, in order for there to still be clearance for the spacing to be exceeded, which is required due to the delayed effect of the steering intervention. Effectively, this means that the driver assistance system steers the vehicle within a driving corridor of the electrified lane, so that the contact point of the contact wire does not leave the operating region of the contact strip. Thus, the contact point of the contact wire may be kept in the center of the contact strip to the greatest possible extent.

In a further advantageous embodiment of the vehicle according to the invention, the driver assistance system is configured to execute the automatic steering intervention in such a manner that the operating region of the contact strip is utilized evenly. This means that an even wear is achieved over the entire operating region of the contact strip and therefore the service life until it becomes necessary to change the contact strip is increased. In addition, the steering movements avoid the heavy formation of ruts in the lane by using a wider driving corridor within the electrified lane.

In a further advantageous embodiment of the vehicle according to the invention, the evaluation unit is embodied to ascertain a contact force between the contact strip and the contact wire from the sum of the two sensor signals that represent the compression paths. The recording facility may additionally be used to ascertain the current contact force, which avoids a specific measuring apparatus for this purpose. From the sum of the spring forces acting on the spring elements, the contact force currently exerted on the contact wire by the contact strip is produced.

In a further advantageous embodiment of the vehicle according to the invention, the current collector has a control unit for activating and deactivating a pressure application of the lift drive. In this context, the control unit is connected to the evaluation unit and is configured such that the lift drive is actuated to regulate the contact force between contact strip and contact wire as a function of the ascertained contact force. Due to this regulation, it is possible to sustain a contact force, at different contact wire heights and during vehicle oscillations that occur, which is as low as possible with regard to the wear of the contact strip, but is great enough to safely transmit energy.

In a further advantageous embodiment of the vehicle according to the invention, the control unit is configured such that the lift drive is deactivated if no compression path of the spring elements is measured above a predefinable setup height of the contact rocker. If the control unit assesses that the contact strip is not being compressed past an anticipated contact wire height, then a lowering of the current collector is initiated, as a contact wire is clearly not or no longer present at the vehicle position.

In a further advantageous embodiment of the vehicle according to the invention, the control unit is configured such that the lift drive is deactivated if the measured lateral position of the contact point reaches or exceeds edge-side limit positions of the operating region of the contact strip. Likewise, the current collector is lowered for safety reasons if the vehicle has to leave the electrified lane, during an evasive or overtaking maneuver for example, and in doing so the contact wire threatens to leave the operating region of the contact strip to the side.

Further properties and advantages of the vehicle according to the invention will emerge from the drawings described in further detail below.

DETAILED DESCRIPTION OF THE INVENTION

Figure 1:
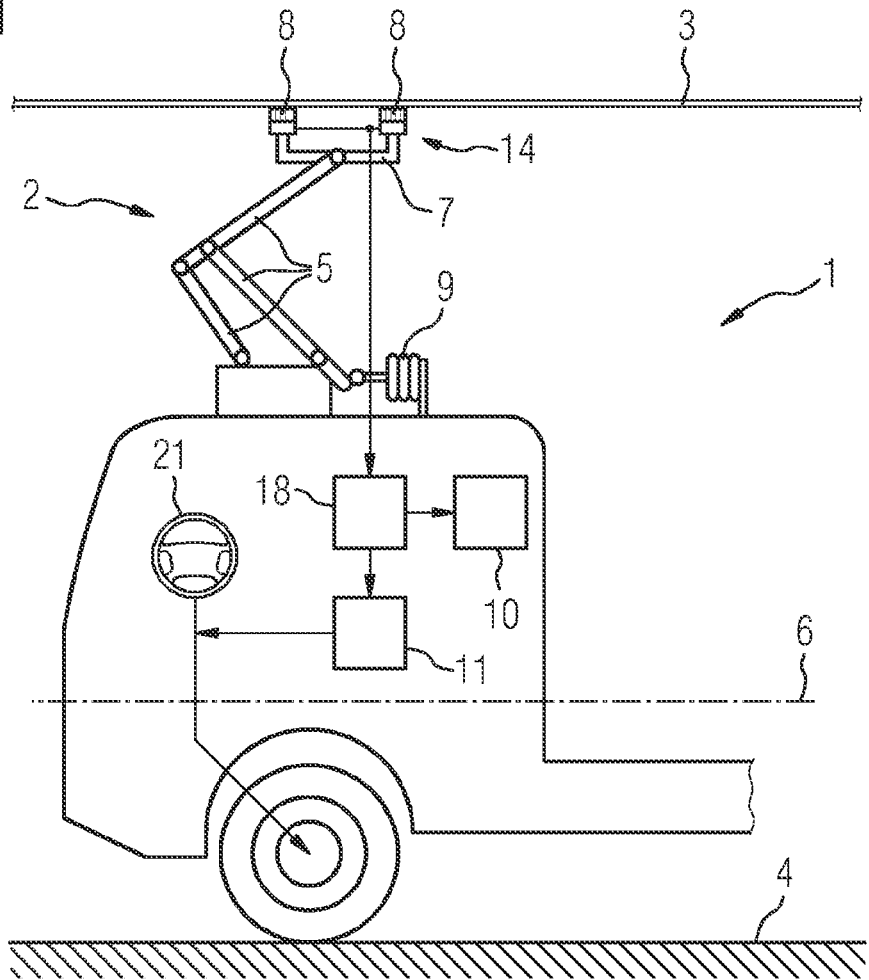
FIG. 1 schematically illustrates a vehicle according to the invention with a current collector in a side view and FIG. 2 schematically illustrates a partial cutout of a contact rocker of the current collector from FIG. 1 in a front view.

In accordance with FIG. 1, a non-track-bound, electrically driven vehicle 1, which may be embodied as a tractor unit of an articulated truck, comprises a current collector 2 for feeding electrical energy from a two-pole overhead line system. The overhead line system comprises two contact wires 3 that are embodied as forward and return conductors and are tensioned in parallel above an electrified lane 4 of a roadway. The current collector 2 has an articulated support linkage 5, which on the contact wire side supports two contact rockers 7 that are arranged next to one another in relation to a vehicle longitudinal axis 6. Each contact rocker 7 has two elongated contact strips 8 that are arranged one behind the other in relation to the vehicle longitudinal axis 6 and are provided for establishing an electrical sliding contact with the contact wires 3. On the vehicle, the support linkage 5 is coupled to a lift drive 9 for setting up the support linkage 5 and for pressing the contact rockers 7 onto the contact wire 3 of the overhead line system. The current collector 2 has a control unit 10 for activating and deactivating a pressure application of the lift drive 9, whereby the support linkage 5 is set up and collapsed and as a result the contact rockers 7 can be raised and lowered between a lower idle position and an upper contact position. The vehicle 1 further comprises a driver assistance system 11 for executing an automatic steering intervention, which may be embodied as a lane departure warning system with corresponding identification sensor system for lane markings.

Figure 2:
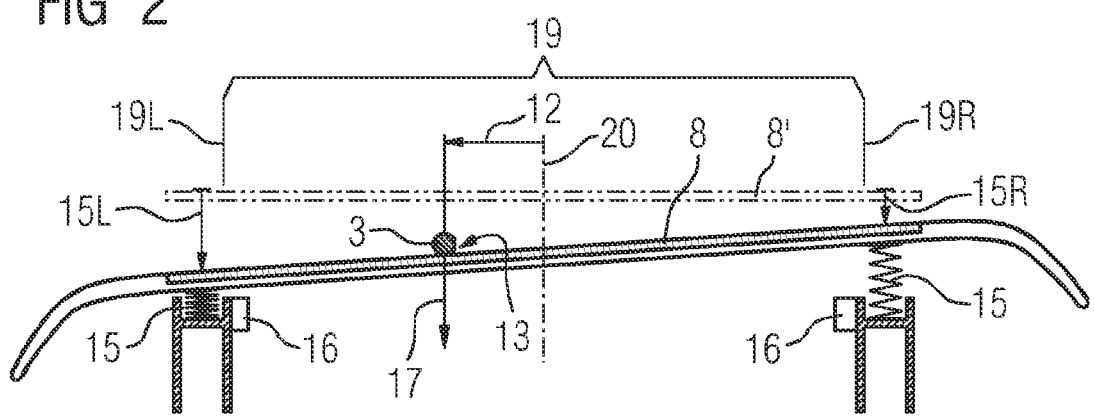

In order to record a lateral position 12 of a contact point 13 of the contact wire 3 on a contact strip 8, for example measured from a contact strip center 20, the vehicle 1 comprises a recording facility 14 with further reference to FIG. 2. To this end, the contact strips 8 are in each case braced against the contact rocker 7 via two spring elements 15 embodied as leaf springs, for example. The recording facility 14 has two path sensors 16 that operate in a contactless manner for measuring compression paths 15L and 15R of the spring elements 15. The compression paths 15L and 15R can be identified in FIG. 2, as the contact strip 8' is also modeled in a neutral position, in which it is not in contact with a contact wire 3. The compression paths 15L and 15R are given by the spring constants of the spring elements 15, by the lateral position 12 of the contact point 13 and by the contact force 17 acting at the contact point 13 between contact wire 3 and contact strip 8. The recording facility 14 also has an evaluation unit 18, which is connected to the path sensors 16 by radio or in a wired manner and ascertains the lateral position 12 of the contact point 13 from sensor signals that represent the measured compression paths 15L and 15R. The driver assistance system 11 guides the automatic steering intervention as a function of the recorded lateral position 12 of the contact point 13, in order to make available a constant maintaining of contact between the current collector 2 and the overhead line system.

In order to minimize negative effects due to non-linearities in the sensor signals of the path sensors 16 operating in a capacitive or inductive manner, the evaluation unit 18 is embodied to ascertain the lateral position 12 of the contact point 13 from the difference between the quotient derived from the two sensor signals representing the compression paths 15L and 15R and the reciprocal value of said quotient.

The driver assistance system 11 is configured to execute the automatic steering intervention in such a manner that the contact point 13 of the contact wire 3 on the contact strip 8 is kept within a predefined operating region 19 of the contact strip 8, preferably such that the operating region 19 of the contact strip 8 is used evenly. This distributes the abrasion of the contact strips 8 over the entire operating region 19 thereof, meaning that they wear down less quickly and have to be replaced less often. In addition, the formation of ruts in the lane 4 is reduced when the driver assistance system 11 does not permanently keep the vehicle 1 in the center of the lane, but rather utilizes a certain driving corridor within the electrified lane 4.

The evaluation unit 18 is moreover embodied to ascertain the contact force 17 between the contact strips 8 and the contact wires 3 from the sum of the two sensor signals that represent the compression paths 15L and 15R. This results in the sum of the sub-contact forces, which cause the compression paths 15L and 15R, at the spring elements 15 with known spring constant. The control unit 10 is connected to the evaluation unit 18 and is configured such that the lift drive 9 is actuated to regulate the contact force 17 between contact strip 8 and contact wire 3 as a function of the ascertained contact force 17. In this way, no further measuring apparatus is required for determining the contact force 17 and it can be regulated in a desired force range.

The control unit 10 is also configured in such a manner that the lift drive 9 is deactivated if no compression path 15L and 15R of the spring elements 15 is measured above a predefinable setup height of the contact rockers 7. The current collector 2 is thus lowered when no contact wire 3 is present above the vehicle 1. The lift drive 9 may also be deactivated if the measured lateral position 12 of the contact point 13 reaches or exceeds edge-side limit positions 19L or 19R of the operating region 19 of the contact strip 8. If a manual steering intervention via the steering wheel 21 necessitates leaving the driving corridor traveled by the driver assistance system 11, for example during overtaking or evasive maneuvers, then the current collector 2 is lowered when the contact point 13 reaches one of the limit positions 19L or 19R, so that the current collector 2 automatically assumes a safe operating position.

The invention claimed is:

1. A non-track-bound, electrically driven vehicle, comprising:
   a current collector for feeding electrical energy from a two-pole overhead line, said current collector having a contact rocker with a contact strip, a lift drive and an articulated support linkage supporting said contact rocker with said contact strip on a contact wire side and on a vehicle side said articulated support linkage is coupled to said lift drive for setting up said articulated support linkage and for pressing said contact rocker onto a contact wire of the two-pole overhead line;
   a recorder for recording a lateral position of a contact point of the contact wire on said contact strip;
   a driver assistance system for executing an automatic steering intervention in dependence on a measured lateral position of the contact point;
   at least two spring elements, said contact strip being braced against said contact rocker via said at least two spring elements;
   said recorder having two path sensors for measuring compression paths of said at least two spring elements; and
   an evaluation unit connected to said two path sensors for ascertaining the lateral position of the contact point from sensor signals representing measured compression paths.

2. The vehicle according to claim 1, wherein said two path sensors are embodied for measuring the compression paths of said at least two spring elements in a contactless manner.

3. The vehicle according to claim 1, wherein said evaluation unit is embodied to ascertain the lateral position of the contact point from a difference between a quotient derived from the two sensor signals representing the compression paths and a reciprocal value of the quotient.

4. The vehicle according to claim 1, wherein said driver assistance system configured to execute the automatic steering intervention in such a manner that the contact point of the contact wire on said contact strip is kept within a predefined operating region of said contact strip.

5. The vehicle according to claim 4, wherein said driver assistance system is configured to execute the automatic steering intervention in such a manner that the predefined operating region of said contact slip is evenly utilized.

6. The vehicle according to claim 1, wherein said evaluation unit is embodied to ascertain a contact force between said contact strip and the contact wire from a sum of two of the sensor signals that represent the compression paths.

7. The vehicle according to claim 1, wherein said current collector has a controller for activating and deactivating a pressure application of said lift drive, wherein said controller is connected to said evaluation unit and is configured in such a manner that said lift drive is actuated to regulate a contact force between said contact strip and contact wire in dependence on the contact force.

8. The vehicle according to claim 7, wherein said controller is configured in such a manner that said lift drive is deactivated if no compression path of said at least two spring elements is measured above a predefinable setup height of said contact rocker.

9. The vehicle according to claim 7, wherein said controller is configured in such a way that said lift drive is deactivated when the measured lateral position of the contact point reaches or exceeds edge-side limit positions of an operating region of said contact strip.

* * * * *